United States Patent
Abeygunawardana et al.

(10) Patent No.: US 12,465,178 B2
(45) Date of Patent: Nov. 11, 2025

(54) SYSTEMS AND METHODS FOR FINE ADJUSTMENT ON A STAND MIXER

(71) Applicant: Haier US Appliance Solutions, Inc., Wilmington, DE (US)

(72) Inventors: Danister Abeygunawardana, Jeffersonville, IN (US); Tomas Garces, Louisville, KY (US); Martin Scott Mershon, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 802 days.

(21) Appl. No.: 17/839,581

(22) Filed: Jun. 14, 2022

(65) Prior Publication Data

US 2023/0397768 A1 Dec. 14, 2023

(51) Int. Cl.
*A47J 43/07* (2006.01)
*A47J 43/044* (2006.01)

(52) U.S. Cl.
CPC ......... *A47J 43/0727* (2013.01); *A47J 43/044* (2013.01); *A47J 43/0705* (2013.01); *A47J 2043/04463* (2013.01)

(58) Field of Classification Search
CPC .. A47J 43/0727; A47J 43/044; A47J 43/0705; A47J 2043/04463; B01F 27/805; B01F 35/40; B01F 35/42; B01F 35/43
See application file for complete search history.

(56) References Cited

U.S. PATENT DOCUMENTS

| | | | | |
|---|---|---|---|---|
| 1,465,633 | A | * 8/1923 | Gilchrist | A47J 43/044 366/207 |
| 1,846,405 | A | * 2/1932 | Stroud | A47J 43/044 200/410 |
| 1,968,268 | A | * 7/1934 | Strongson | A47J 43/044 366/203 |
| 2,192,199 | A | * 3/1940 | Myers | A47J 43/044 366/207 |
| 4,500,210 | A | 2/1985 | Vilen | |
| 6,966,691 | B2 | 11/2005 | Brunswick et al. | |
| 8,182,135 | B2 | 5/2012 | Blackburn | |
| 10,799,072 | B2 | 10/2020 | Ambrose et al. | |
| 2009/0185443 | A1* | 7/2009 | Blackburn | A47J 43/0727 366/261 |
| 2019/0008325 | A1* | 1/2019 | Huerta-Ochoa | A47J 43/082 |

FOREIGN PATENT DOCUMENTS

DE 1263251 B * 3/1968
WO WO2014207485 A1 12/2014

* cited by examiner

*Primary Examiner* — Marc C Howell
(74) *Attorney, Agent, or Firm* — Dority & Manning, P.A.

(57) ABSTRACT

A stand mixer includes a column, a column rail mounted to the column and a bowl support mounted to the column rail such that the bowl support is vertically translatable along the column. A bowl is mounted to the bowl support. A fine adjustment apparatus is configured for adjusting a height of the bowl on the bowl support. The fine adjustment apparatus includes a cam rotatably mounted on the column. A cam tab on the column rail engages the cam. The cam and cam tab are configured such that the bowl support vertically translates in relation to the column as the cam rotates.

20 Claims, 6 Drawing Sheets

SYSTEMS AND METHODS FOR FINE ADJUSTMENT ON A STAND MIXER

FIELD OF THE INVENTION

The present disclosure relates generally to bowl supports for stand mixers, more particularly adjustment of a bowl on a stand mixer.

BACKGROUND OF THE INVENTION

Stand mixers generally include support for mounting a bowl on the stand mixer during operation. However, to use certain mixers, the bowl is typically mounted on the mixer in a first, non-mixing position where in ingredients may be introduced into the bowl and the mixer may be prepared for mixing. The bowl is then lifted into a mixing position wherein the contents of the bowl are brought into contact with a mixing attachment and mixing is begun. However, when positioned in the mixing position, the contents of the bowl may not be in the optimal position to be completely and efficiently mixed. If the bowl is too low, then the contents at the bottom of the bowl may be insufficiently mixed. If the bowl is too high, then content near the top of the bowl may not be in contact with the operational portion of the mixing attachment. There is currently no easy and efficient way for the user to finely adjust the height of the bowl on the stand mixer to ensure that the mixing of the ingredients by the mixer is efficient and complete.

BRIEF DESCRIPTION OF THE INVENTION

Aspects and advantages of the invention will be set forth in part in the following description, or may be apparent from the description, or may be learned through practice of the invention.

The present subject matter provides stand mixer with a bowl, a column, and a bowl support. Advantageously, the stand mixer allows for the fine adjustment for the height of the bowl on the bowl support. A method for fine adjustment of the height of a bowl of a stand mixer is also provided. Aspects and advantages of the invention will be set forth in part in the following description, may be apparent from the description, or may be learned through practice of the invention.

In one example embodiment, a stand mixer includes a column, a column rail mounted to the column and a bowl support mounted to the column rail such that the bowl support is vertically translatable along the column. A bowl is mounted to the bowl support. A fine adjustment apparatus is configured for adjusting a height of the bowl on the bowl support. The fine adjustment apparatus includes a cam rotatably mounted on the column. A cam tab on the column rail engages the cam. The cam and cam tab are configured such that the bowl support vertically translates in relation to the column as the cam rotates.

In another example embodiment, a method for fine adjustment of a height of a bowl on a stand mixer. The stand mixer includes a column with a vertical axis, a column rail, and a bowl support mounted to the column rail. A cam is rotatably affixed to the column. The method includes rotating the cam to traverse the bowl support to a desired height in relation to the column in a direction parallel to the vertical axis.

These and other features, embodiments and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
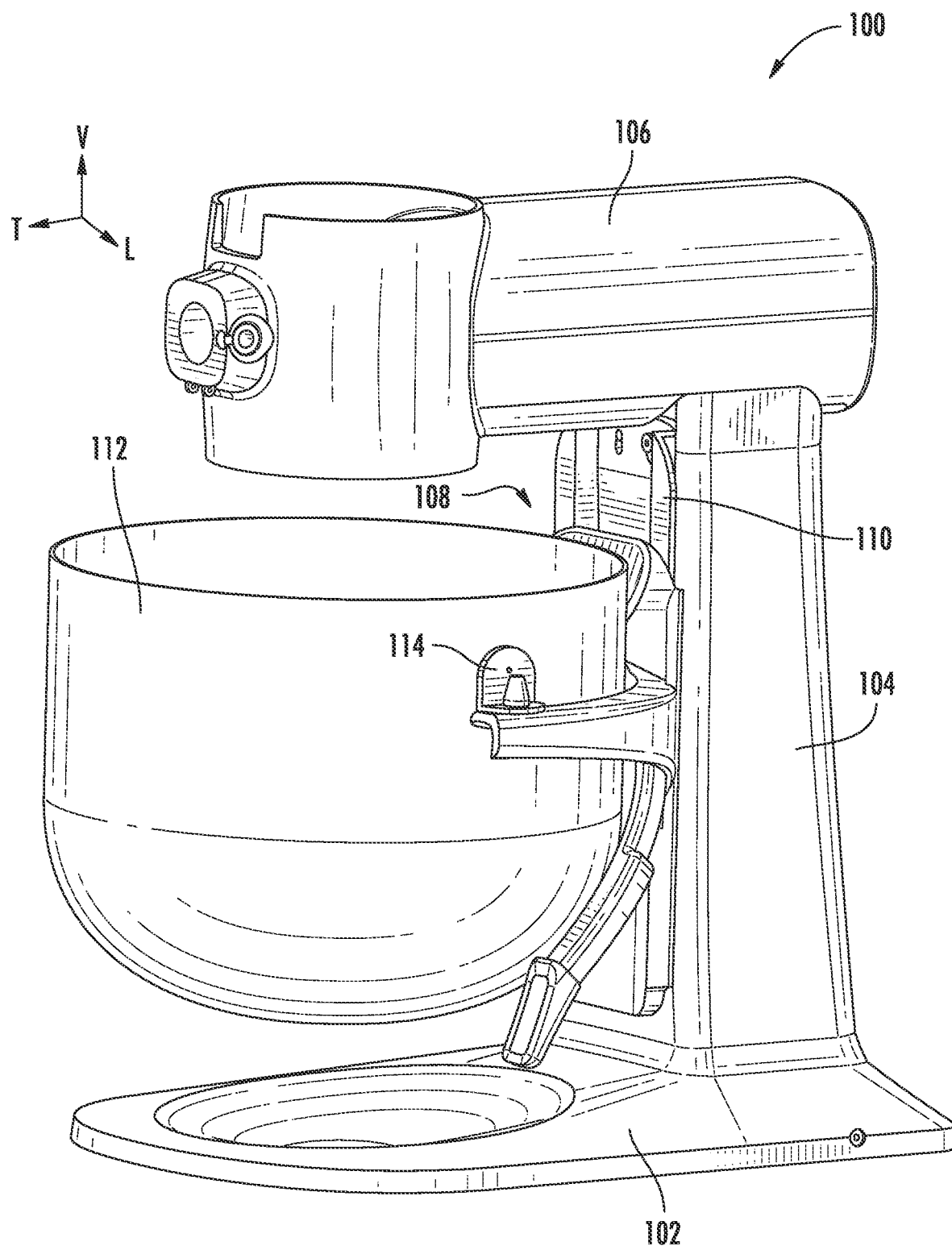
FIG. 1 illustrates an isometric perspective view of an example embodiment of a stand mixer of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

FIG. 1 provides an isometric view of a stand mixer 100 according to an example embodiment of the present subject matter. It will be understood that stand mixer 100 is provided by way of example only and that the present subject matter may be used in or with any suitable stand mixer in alternative example embodiments. Moreover, with reference to each of FIGS. 1 through 3, stand mixer 100 defines a vertical direction V, a lateral direction L, and a transverse direction T, which are mutually perpendicular and form an orthogonal direction system. It should be understood that these directions are presented for example purposes only, and that relative positions and locations of certain aspects of stand mixer 100 may vary according to specific embodiments, spatial placement, or the like.

Stand mixer 100 may include a base 102 and a support column 104. The support column 104 may support a mixer head 106, which is positioned atop column 104. The mixing head 106 may house a motor, a gearbox, and/or a drivetrain apparatus (not shown) of stand mixer 100. As shown in FIG. 1, head 106 may be mounted to column 104, which is mounted to base 102. Thus, column 104 may extend between and connect base 102 and head 106, e.g., along the vertical direction V. Head 106 may extend outwardly above the base 102 in the transverse direction T.

Column 104 may also include a bowl lift framework 108. Bowl lift framework 108 may slidably mount to a column rail 110, which is mounted to column 104. In an example embodiment, column rail 110 may provide a lower limit for the vertical translation of bowl 112. Components of bowl lift framework 108 may extend outwardly above the base 102, e.g., in the transverse direction T, and may hold bowl 112 above, vertically, base 102. Bowl 112 may be removably mounted on bowl lift framework 108 via flanges 114. Flanges 114 may be on opposite sides of the bowl 112 with respect to the circumference of the bowl.

Operation of stand mixer 100 is described below. In the operation of stand mixer 100, a user may load food items into bowl 112. The food items may be ingredients such as flour, water, milk, etc. These items are provided for example purposes only and one skilled in the art would appreciate that there are many more types of food items that may be placed in bowl 112 of stand mixer 100. After loading the food items into bowl 112, a user turns on a motor to begin the process of mixing, kneading, beating, etc. The motor rotates an attachment attached to stand mixer 100 to complete each of these processes. The processes may be conducted with a respective attachment, such as a mixer blade for mixing, a dough hook for kneading, and a balloon whisk for beating.

Figure 3:
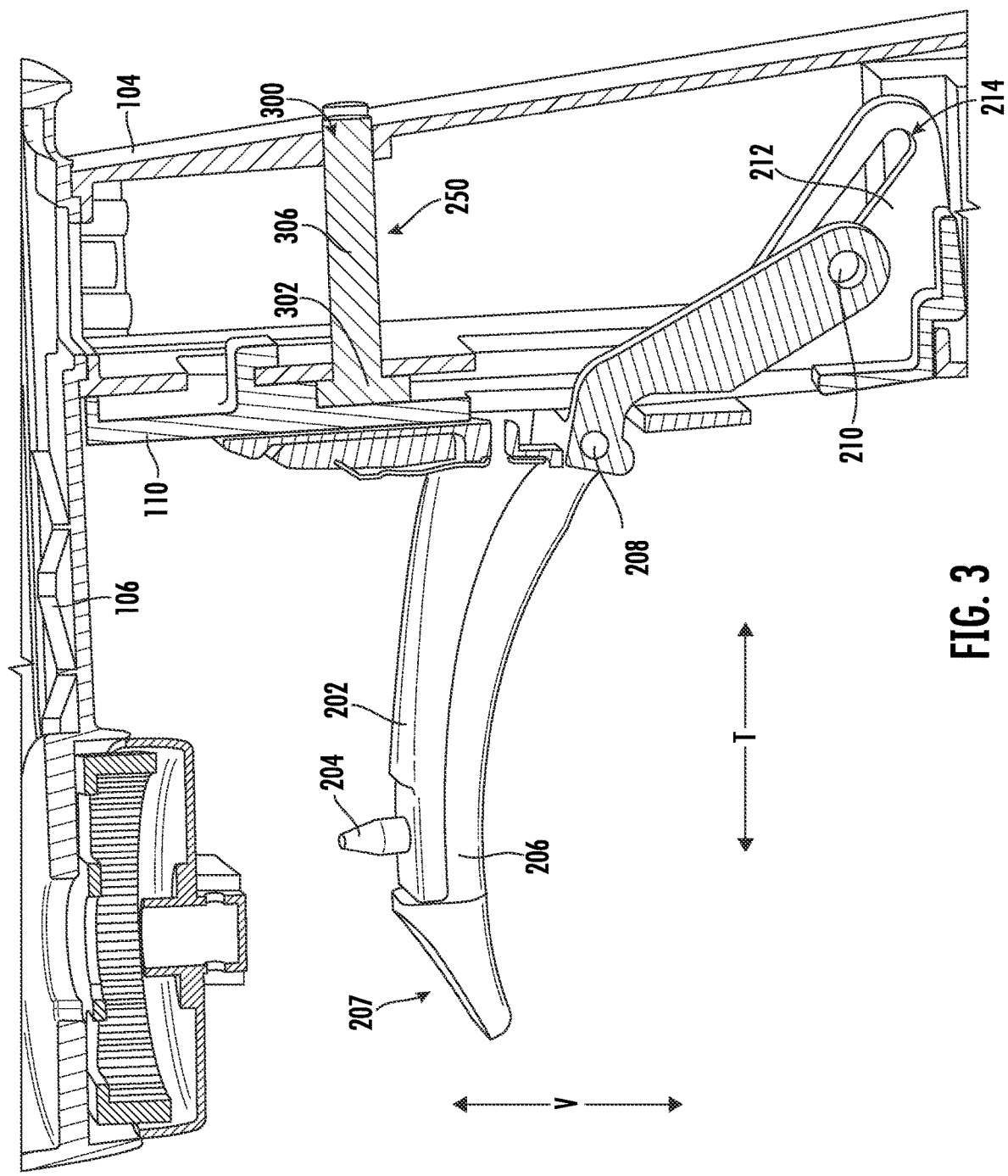
FIG. 3 provides a side, section view of the example stand mixer of FIG. 1.
Figure 4:
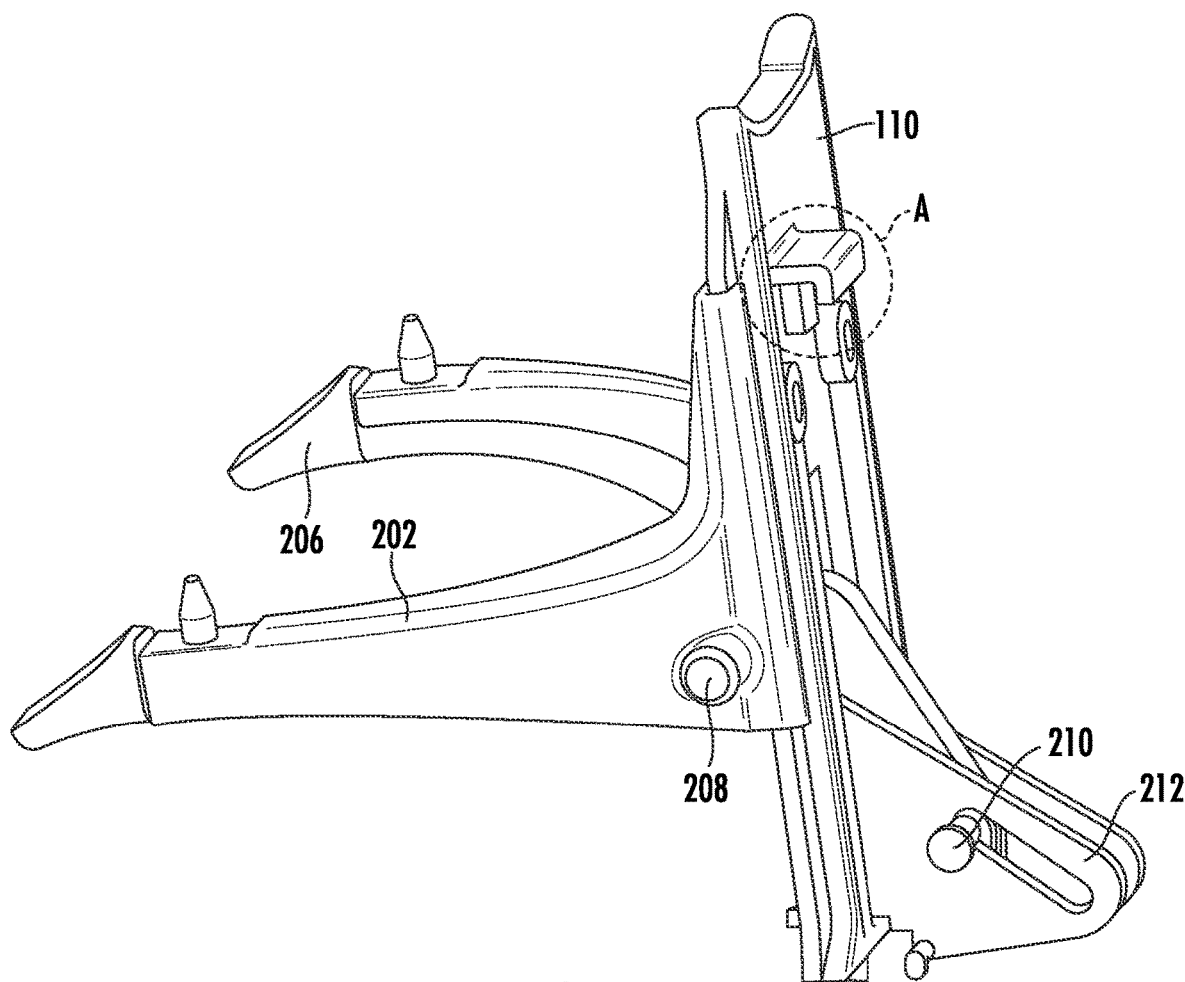
FIG. 4 provides a rear isometric view of a bowl support of the example stand mixer of FIG. 1.

Shown in a side, section view in FIG. 3, bowl lift framework 108 may include a bowl support 202, with a mounting spike 204. Bowl carrier 202 may hold bowl 112 via mounting spike 204, which may removably couple to flanges 114 on bowl 112 (FIG. 1). For instance, each mounting spike 204 on bowl support 202 may be received within a respective flange 114 on bowl 112. Bowl support 202 may be mounted to a column rail 110. In some example embodiments, bowl support 202 may be slidably mounted on column 104. Lift arm 206 may rotatably couple to bowl carrier 202 via a hinge pin 208. There may be at least two lift arms 206. Thus, bowl 112 may be disposed between lift arms 206, e.g., along the lateral direction L. Each lift arm 206 may be positioned on a respective side of bowl 112, such that both a left-handed user and a right-handed user may comfortably operate lift arms 206. Lift arm 206 may have one end 207 cantilevered from support column 104. Such distal end 207 may correspond to a handle for a user to grasp, push, or pull lift arm 206.

When rotating lift arm 206 about hinge pin 208, a ramp pin 210 may slide along a ramp block 212. Ramp pin 210 may be disposed on an end of lift arm 206, e.g., within column 104. Ramp pin 210 may slidably couple lift arm 206 to ramp block 212 such that ramp pin 210 may slide within slot 214 defined by ramp block 212. The ends of slot 214 delimit a traversable distance for bowl support 202. FIG. 3 also illustrates a fine adjustment apparatus 250 that may include a cam 300 extending through column 104. For example, cam 300 may have a shaft 306 extending into column 104. Cam 300 may include a cam head 302 positioned in contact with column rail 110. Cam 300 will be described in further detail herein.

Figure 2:
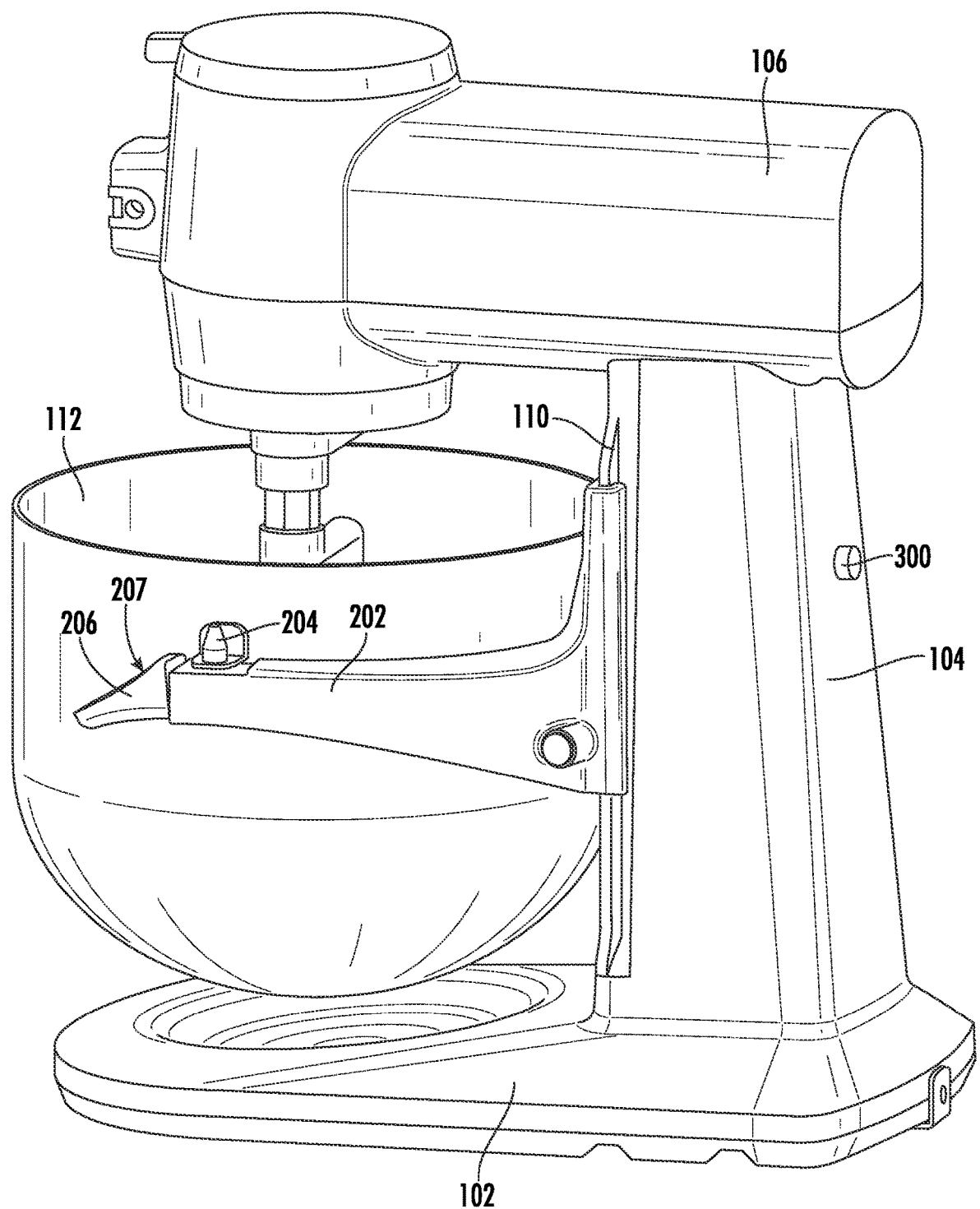
FIG. 2 illustrates a rear isometric perspective view of the example stand mixer of FIG. 1

In the shown position in FIG. 2, otherwise referred to as the up position, bowl 112 may be elevated vertically from base 102 of stand mixer 100 when lift arm 206 is actuated. For example, when lift arm 206 is actuated, a user rotates lift arm 206 to a horizontal position. When bowl 112 is raised vertically, V, from base 102, bowl 112 is positioned closer to head 106 for stand mixer 100 to mix the contents of bowl 112. In an opposing position, otherwise known as the down position, bowl 112 may be lowered to base 102 of stand mixer 100, or proximate above base 102. In the down position, lift arm 206 is disengaged, angled downward toward base 102. Bowl 112 may be in the first position so that there is more space between bowl 112 and head 106 such that ingredients may be added to the bowl.

Figure 5:
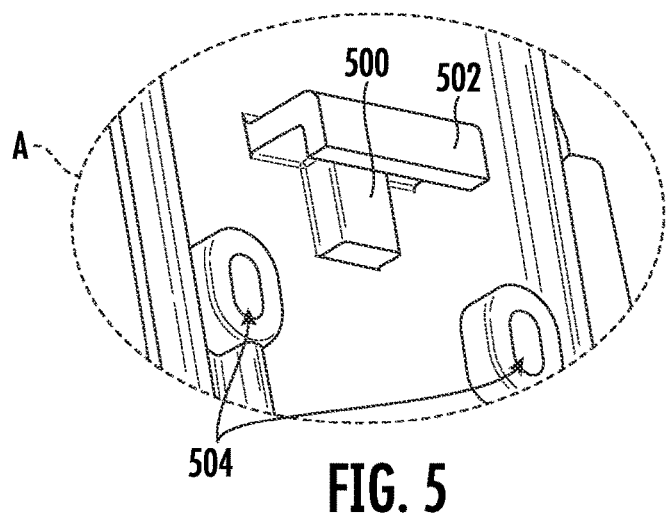
FIG. 5 provides a detailed section view A from FIG. 4 of a mounting tab.
Figure 6:
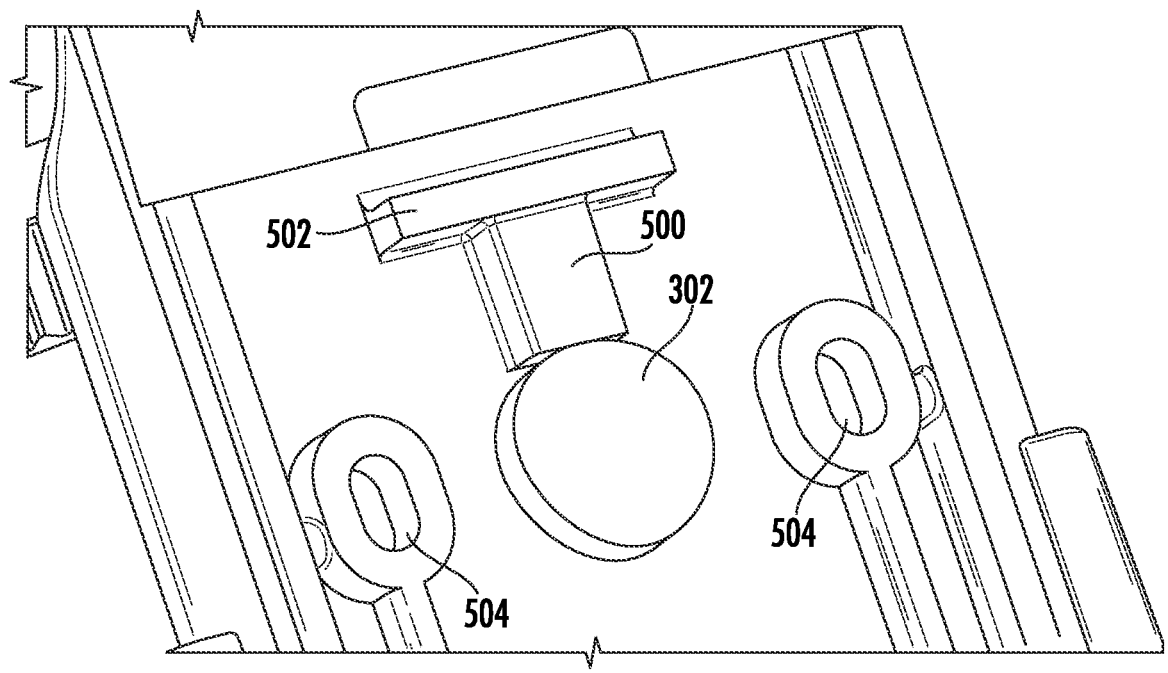
FIG. 6 provides a rear view of a column rail of the example stand mixer of FIG. 1
Figure 7:
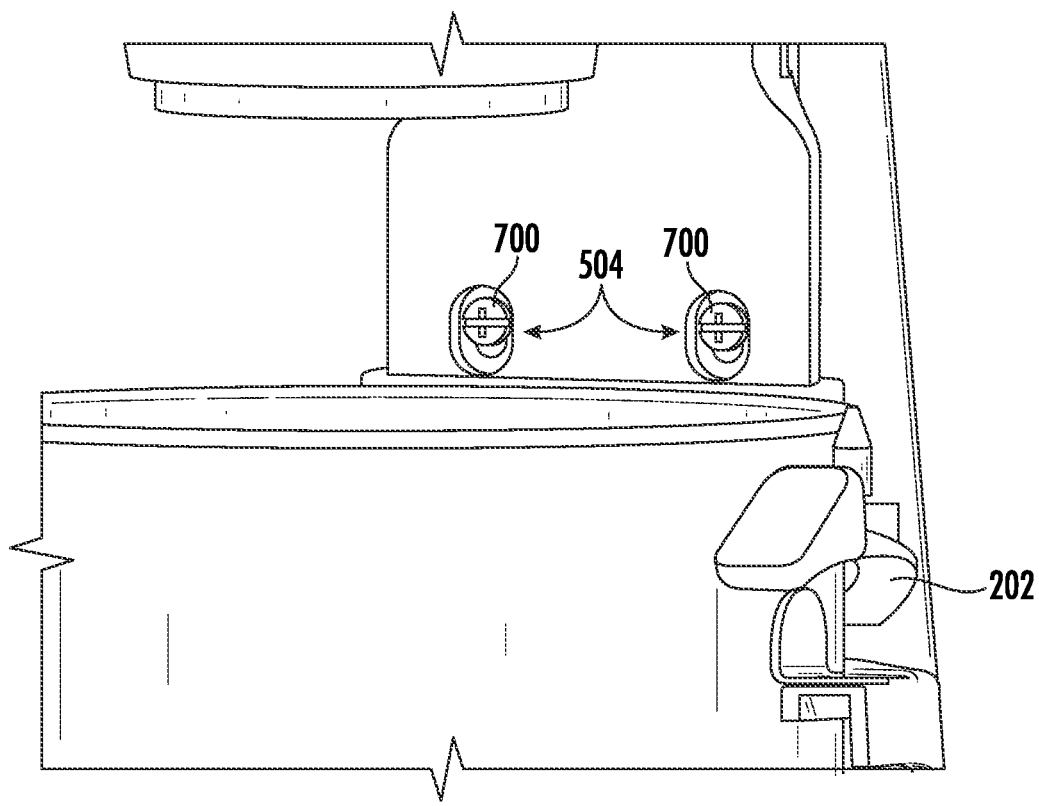
FIG. 7 provides a front view of the column rail of FIG. 7.
Figure 8:
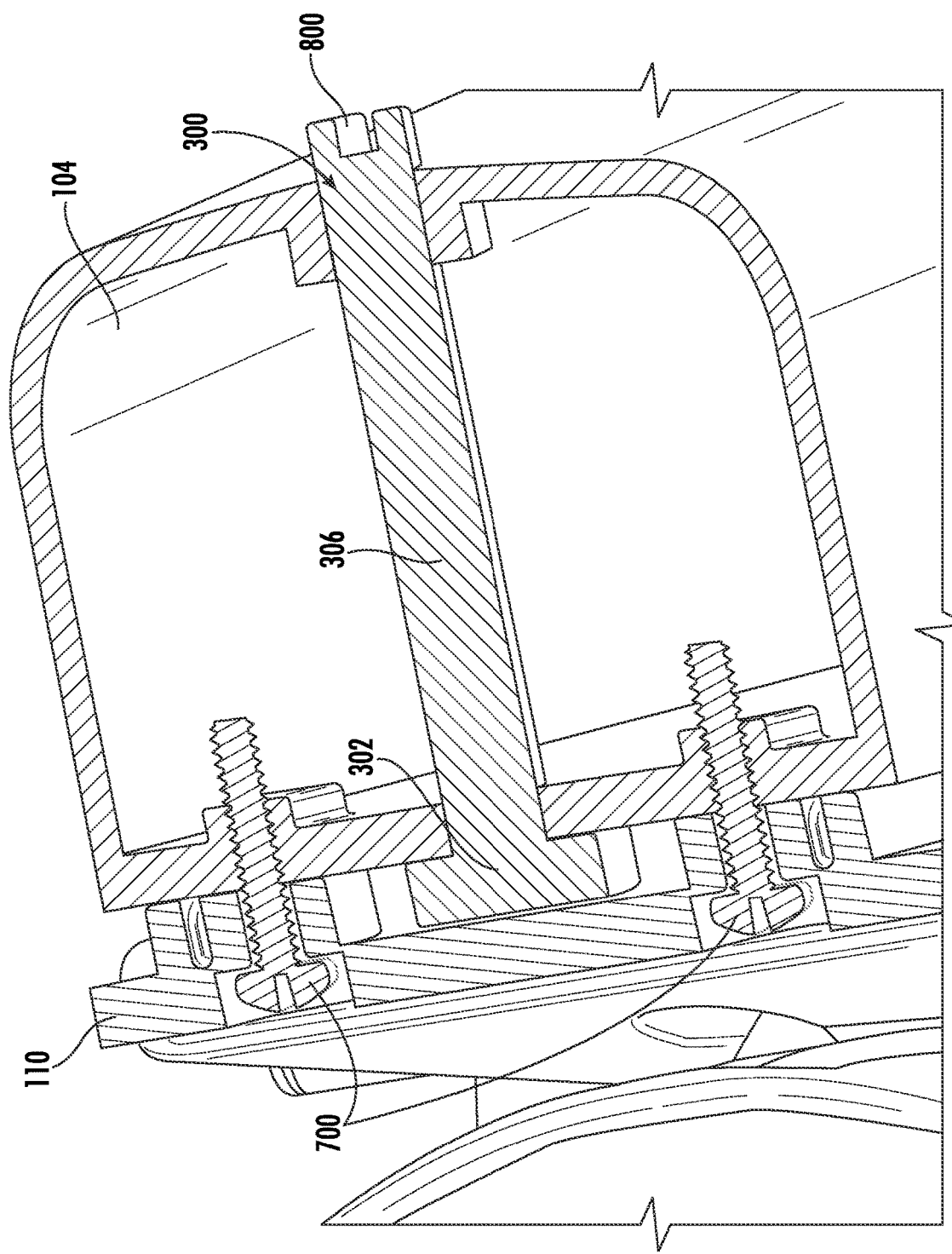
FIG. 8 provides a top section view of a cam and fastener of the example stand mixer of FIG. 1.

FIGS. 4-8 illustrate bowl support 202 and column rail 110. Shown in FIG. 5 is section view A of FIG. 4. Section view A illustrates an adjustment tab 500 and a hook 502. Adjustment tab 500 may be in contact with cam head 302 of cam 300 as a part of the fine adjustment apparatus 250. One or more of a fastener slot 504 may be in column rail 110. The fine adjustment apparatus 250 may be configured for adjusting a height of the bowl on the bowl support. Cam 300 may be rotatably mounted on column 104. Cam 300 may include a cam slot 800 configured for selectively rotating cam 300. Cam slot 800 may be positioned at an exterior of column 104. Cam slot 800 may be configured for a thumb screw, a dial, or any other suitable tool receiving orifice for rotating cam 300.

Adjustment tab 500 on column rail 110 may engage cam head 302 such that bowl support 202 may vertically translate in relation to column 104 as cam 300 rotates. A locking pin 700, such as a screw, fastener, or rigid structure, may be positioned in fastener slot 504 such as to restrain the movement of column rail 110 and bowl support 202. Fastener slot 504 may be configured for selectively fastening fine adjustment apparatus 250 in place. Fastener slot 504 may include at least one flexible fastener, such as a spring in place of a locking pin 700 that when engaged may provide tension between bowl support 202 and column 104.

A method for fine adjustment of the height of bowl 112 of stand mixer 100 includes rotating cam 300 to traverse bowl support 202 to a desired height in relation to column 104 in a direction parallel to the vertical axis V. For example, a user may twist cam slot 800 to rotate cam 300, thus rotating cam head 302, and raising or lowering bowl 112 a fine amount. Locking pin 700 may be used to secure fine adjustment apparatus 250 at the desired height.

As may be seen from the above, stand mixer 100 is a bowl-lift mixer, with lift arm 206 on either side of bowl 112. In the lower position, lift arm 206 are angled downwards. When lift arm 206 are pulled upwards, the bowl lift framework 108 lifts bowl 112 in the vertical direction V. When bowl 112 is in the uppermost position, lift arm 206 may be oriented horizontal. Positioning lift arm 206 around the sides of bowl 112 provides for controlling bowl lift framework 108 from the front and prevents collision with objects behind stand mixer 100. The lift arms 206 positioning also does not require the user to reach over the bowl 112 to actuate. Lift arms 206 may be rotatably attached to bowl carrier 202 via hinge pin 208. Bowl carrier 202 may be slidably mounted to column rails 110 but constrained otherwise. Rotating cam 300 of fine adjustment apparatus 250 may raise or lower bowl 112 in between a range smaller than the range of raising and lowering bowl 112 via lift arms 206. It is advantageous for a user of stand mixer 100 to use the fine adjustment of bowl 112 in order to reduce the distance between a mixing attachment and the bottom of bowl 112, thus improving the quality of the mixing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A stand mixer, comprising:
   a column;
   a column rail mounted to the column;
   a bowl support mounted to the column rail such that the bowl support is vertically translatable along the column;
   a bowl mounted to the bowl support;
   a fine adjustment apparatus configured for adjusting a height of the bowl on the bowl support; and
   a fastener slot configured for selectively fastening the fine adjustment apparatus in place, the fine adjustment apparatus comprising:
      a cam rotatably mounted on the column, an end of the cam defining a cam head, and
      an adjustment tab on the column rail and engaging the cam,
      wherein the cam and cam tab are configured such that the bowl support vertically translates in relation to the column as the cam rotates.

2. The stand mixer of claim 1, wherein the bowl support is slidably mounted on the column.

3. The stand mixer of claim 1, wherein the fastener slot comprises at least one flexible fastener, wherein, when engaged, the flexible fastener provides tension between the bowl support and the column.

4. The stand mixer of claim 1, wherein the fastener slot comprises a locking pin, wherein engaging the locking pin in the fastener slot restrains movement of the fine adjustment apparatus.

5. The stand mixer of claim 1, further comprising a cam slot configured for selectively rotating the cam.

6. The stand mixer of claim 5, wherein the cam comprises a shaft affixed to the cam and the cam slot is positioned at an exterior of the column.

7. The stand mixer of claim 6, wherein the cam slot is one of a thumb screw, a dial, and a tool receiving orifice.

8. The stand mixer of claim 1, wherein the column rail provides a lower limit for the vertical translation of the bowl support.

9. The stand mixer of claim 1, further comprising a ramp block with a slot, and the ends of the slot delimit a traversable distance for the bowl support.

10. The stand mixer of claim 4, wherein the locking pin is rigid.

11. A method for fine adjustment of a height of a bowl of a stand mixer, wherein the stand mixer comprises a column defining a vertical axis, a column rail, a bowl support mounted to the column rail, and a cam rotatably affixed to the column, the method comprising:
   rotating the cam in order to traverse the bowl support to a desired height in relation to the column in a direction parallel to the vertical axis, and
   securing a fastener within a fastener slot to fasten the column rail in place along the direction parallel to the vertical axis.

12. The method of claim 11, wherein the fastener comprises at least one flexible fastener, wherein, when secured, the flexible fastener provides tension between the bowl support and the column.

13. The method of claim 11, wherein the fastener comprises a locking pin, wherein securing the locking pin in the fastener slot restrains movement of column rail.

14. The method of claim 11, wherein rotating the cam comprises rotating a cam slot.

15. The method of claim 14, wherein the cam comprises a shaft affixed to the cam and the cam slot is positioned at an exterior of the column.

16. The method of claim 15, wherein the cam slot is selected from the group consisting of a thumb screw, a dial, and a tool receiving orifice.

17. The method of claim 11, wherein the column rail defines a lower limit for translation of the bowl support.

18. The method of claim 11, wherein the stand mixer further comprises a ramp block with a slot, each end of the slot delimiting a traversable distance for the bowl support along the direction parallel to the vertical axis.

19. A stand mixer, comprising:
   a column;
   a column rail mounted to the column;
   a bowl support mounted to the column rail such that the bowl support is vertically translatable along the column;
   a bowl mounted to the bowl support;
   a ramp block with a slot, and the ends of the slot delimit a traversable distance for the bowl support; and
   a fine adjustment apparatus configured for adjusting a height of the bowl on the bowl support, the fine adjustment apparatus comprising:
      a cam rotatably mounted on the column, an end of the cam defining a cam head, and
      an adjustment tab on the column rail and engaging the cam,
      wherein the cam and cam tab are configured such that the bowl support vertically translates in relation to the column as the cam rotates.

20. The stand mixer of claim 19, further comprising a cam slot configured for selectively rotating the cam.

* * * * *